United States Patent
De Wolf et al.

(10) Patent No.: US 9,587,171 B2
(45) Date of Patent: *Mar. 7, 2017

(54) AMMONIUM SALTS OF CHELATING AGENTS AND THEIR USE IN OIL AND GAS FIELD APPLICATIONS

(75) Inventors: Cornelia Adriana De Wolf, Eerbeek (NL); James N. Lepage, Chicago, IL (US); Hisham Nasr-El-Din, College Station, TX (US); Mohamed Ahmed Nasr-El-Din Mahmoud, Dhahran (SA); Edwin Rudolf Antony Bang, Arnhem (NL); Noble Thekkemelathethil George, College Station, TX (US)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/993,831

(22) PCT Filed: Dec. 14, 2011

(86) PCT No.: PCT/EP2011/072698
§ 371 (c)(1),
(2), (4) Date: Jun. 13, 2013

(87) PCT Pub. No.: WO2012/080299
PCT Pub. Date: Jun. 21, 2012

(65) Prior Publication Data
US 2013/0281329 A1    Oct. 24, 2013

Related U.S. Application Data

(60) Provisional application No. 61/424,361, filed on Dec. 17, 2010, provisional application No. 61/424,182, filed on Dec. 17, 2010.

(30) Foreign Application Priority Data

Jan. 21, 2011    (EP) .................................. 11151730

(51) Int. Cl.
*C09K 8/86*    (2006.01)
*C09K 8/035*    (2006.01)
*C09K 8/72*    (2006.01)

(52) U.S. Cl.
CPC ................ *C09K 8/86* (2013.01); *C09K 8/035* (2013.01); *C09K 8/72* (2013.01)

(58) Field of Classification Search
CPC .......... C09K 8/035; C09K 8/60; C09K 8/506; C09K 8/04; C09K 8/86; C09K 8/528; C09K 8/74; C09K 8/68; C09K 8/72; C09K 8/536; C09K 8/524; C09K 2208/26; C09K 8/52; C09K 2208/32; C09K 8/12; C09K 8/508; C09K 8/685; C09K 2208/08; C09K 2208/18; C09K 8/10; E21B 43/26; E21B 47/06; E21B 33/12; E21B 43/267; E21B 41/00; E21B 43/16; E21B 47/122; E21B 2034/007;
(Continued)

(56) References Cited

U.S. PATENT DOCUMENTS 5,783,524 A * 7/1998 Greindl .................. C09K 8/528
166/250.05
7,350,574 B2  4/2008 Santra et al.
(Continued)

FOREIGN PATENT DOCUMENTS

EP    0783034 A2    7/1997
EP    0783034 A3    7/1998
(Continued)

OTHER PUBLICATIONS

"OSPAR Guidelines for Completing the Harmonised Offshore Chemical Notification Format (HOCNF)," Ospar Commission, Agreement May 2010, 16 pages.
"OECD Guideline for Testing of Chemicals," Adopted by the Council on Jul. 17, 1992, Biodegradability in Seawater, 27 pages.
SPE133497 "Optimum Injection Rate of a New Chelate That Can Be Used to Stimulate Carbonate Reservoirs", M.A. Mahmoud et al, 2010, Soc. of Petroleum Engineers, pp. 1-22.
(Continued)

*Primary Examiner* — Kumar R Bhushan
(74) *Attorney, Agent, or Firm* — Sandra B. Weiss (57) ABSTRACT

The present invention relates to a process for treating a subterranean formation wherein a fluid containing an ammonium salt of glutamic acid N,N-diacetic acid (GLDA) or methylglycine N,N-diacetic acid (MGDA) is introduced into the formation. The invention also covers a fluid containing an ammonium salt of GLDA and/or MGDA and at least one component from the group of seawater, mutual solvents, anti-sludge agents, (water-wetting or emulsifying) surfactants, foaming agents, corrosion inhibitors corrosion inhibitor intensifiers, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, bactericides/biocides, particulates, crosslinkers, salt substitutes (such as tetramethyl ammonium chloride), relative permeability modifiers, sulfide scavengers, fibres, nanoparticles, and consolidating agents, and covers an ammonium salt of the formula $M_x(NH_4)_yH_z$-GLDA or the formula $M_x(NH_4)_yH_z$-MGDA, wherein M is an alkalimetal cation, x is at least 0.1, y is at least 0.1 and x+y+z=4 for GLDA and x+y+z=3 for MGDA.

8 Claims, 6 Drawing Sheets

(58) Field of Classification Search
CPC .......... E21B 23/06; E21B 34/12; E21B 43/14; E21B 43/168; E21B 23/01; E21B 33/1285; E21B 34/06
See application file for complete search history.

(56) References Cited

U.S. PATENT DOCUMENTS

| | | | |
|---|---|---|---|
| 7,950,462 B2 | 5/2011 | Xiao et al. | |
| 2006/0288910 A1 | 12/2006 | Santra et al. | |
| 2006/0289162 A1 | 12/2006 | Santra et al. | |
| 2007/0131623 A1 | 6/2007 | Javora et al. | |
| 2008/0035340 A1* | 2/2008 | Welton | C09K 8/035 166/279 |
| 2008/0200354 A1* | 8/2008 | Jones | C09K 8/524 507/244 |
| 2010/0160189 A1 | 6/2010 | Fuller et al. | |
| 2012/0202720 A1 | 8/2012 | De Wolf et al. | |
| 2013/0213659 A1* | 8/2013 | Luyster | C09K 8/528 166/312 |
| 2013/0264060 A1 | 10/2013 | De Wolf et al. | |
| 2013/0267446 A1 | 10/2013 | De Wolf et al. | |
| 2013/0274154 A1 | 10/2013 | Nasr-El-Din et al. | |
| 2013/0274155 A1 | 10/2013 | Nasr-El-Din et al. | |
| 2014/0116710 A1 | 5/2014 | Nasr-El-Din et al. | |
| 2014/0120276 A1 | 5/2014 | De Wolf et al. | |
| 2014/0124205 A1 | 5/2014 | Nasr-El-Din et al. | |
| 2015/0005216 A1 | 1/2015 | De Wolf et al. | |
| 2015/0080271 A1 | 3/2015 | De Wolf et al. | |
| 2015/0107832 A1 | 4/2015 | De Wolf et al. | |
| 2015/0141302 A1 | 5/2015 | Nasr-El-Din et al. | |

FOREIGN PATENT DOCUMENTS

| | | | |
|---|---|---|---|
| EP | 1004571 B1 | 9/2004 | |
| EP | 1881018 A1 | 1/2008 | |
| JP | 10077253 A | 4/1996 | |
| JP | 10-087580 A | 4/1998 | |
| JP | 10-175931 A | 6/1998 | |
| JP | 10-87582 A | 7/1998 | |
| JP | 2002-356464 A | 12/2002 | |
| JP | 2003-49155 A | 2/2003 | |
| WO | WO2005/028592 A1 | 3/2005 | |
| WO | WO 2009/086954 | * | 7/2007 |
| WO | WO2007/104054 A1 | 9/2007 | |
| WO | WO2008/015464 A1 | 2/2008 | |
| WO | WO 2008/089262 | * | 7/2008 |
| WO | WO2008/089262 A1 | 7/2008 | |
| WO | WO 2009/006326 | * | 1/2009 |
| WO | WO 2009/024518 | * | 2/2009 |
| WO | WO2009/024518 A1 | 2/2009 | |
| WO | WO 2009/086954 | * | 7/2009 |
| WO | WO2009/086954 A1 | 7/2009 | |
| WO | WO2009/093195 A1 | 7/2009 | |
| WO | WO2009/093196 A1 | 7/2009 | |
| WO | WO 2009/137399 | * | 11/2009 |
| WO | WO2009/137399 A2 | 11/2009 | |
| WO | WO 2010/107721 | * | 9/2010 |
| WO | WO2012/127183 A1 | 9/2012 | |

OTHER PUBLICATIONS

SPE121709, "An Environmentally Friendly Stimulation Fluid for High-Temperature Applications", J.N. Le Page et al, 2010 SPE Journal, pp. 1-7.
SPE127923, "Evaluation of a New Environmentally Friendly Chelating Agent for High-Temperature Applications", M.A. Mahmoud et al, 2010, Soc. of Petroleum Engineers, pp. 1-16.
SPE 131626, "An Effective Stimulation Fluid for Deep Carbonate Reservoirs: A Core Flood Study", J.N. LePage et al, 2010, Soc. of Petroleum Engineers, pp. 1-15.
SPE132286, Stimulation of Carbonate Reservoirs Using GLDA (Chelating Agent) Solutions, M.A. Mahmoud et al, 2010, Soc. of Petroleum Engineers, pp. 1-14.
Search Report and Written Opinion of corresponding International Patent Application No. PCT/EP2011/072698, mailed Mar. 19, 2012.
Search Report of corresponding European Patent Application No. 11151730.6, mailed May 25, 2011.
Options for High-Temperature Well Stimulation, Selah Al-Harthy et al, Oilfield Review/Winter 2008-2009; 20, No. 4, pp. 52-61.
Derwent Abstract of JPH10-077253A, publication of which is Mar. 24, 1998.
Derwent Abstract of JPH10-087580A, publication of which is Apr. 7, 1998.
English Translation (machine) of JPH10-175931A, publication of which is Jun. 30, 1998.
English Translation (machine) of JPH10-087582A, publication of which is Apr. 7, 1998.
Abstract of JP2002-356464A, publication of which is Dec. 13, 2002.
Abstract of JP2003-049155A, publication of which is Feb. 21, 2003.

* cited by examiner

Figure 1- Percentage of biodegradation of triammonium hydrogen-N,N-bis(carboxylatomethyl)-L-glutamate (series 1), sodium acetate (series 1), and tetra-sodium-N,N-bis(carboxylatomethyl)-L-glutamate (series 2) and sodium acetate (series 2) versus time in a Closed Bottle test inoculated with seawater.

Figure 2 - The dissolution of $CaCO_3$ in ammonium GLDA/seawater solutions in the pH range from 3.2 to 10.2 at room temperature.

Figure 3 - The percentage of dissolved iron sulfide as a function of time during treatment with ammonium and sodium GLDA at pH=3.8 and T=90°C.

Figure 4 - The percentage of dissolved iron sulfide as a function of temperature during treatment with ammonium and sodium GLDA at pH=3.8 for 24 hrs.

Figure 5 - The descaling efficiency of ammonium GLDA at pH=4 and pH=8 and sodium GLDA at pH=4 with gypsum ($CaSO_4.2H_2O$) at 20°C.

Figure 6 - Core flooding set-up.

AMMONIUM SALTS OF CHELATING AGENTS AND THEIR USE IN OIL AND GAS FIELD APPLICATIONS

This application is the U.S. National Phase of PCT/EP2011/072698 filed on Dec. 14, 2011 and claims the benefit of U.S. Provisional Application No. 61/424,361 filed on Dec. 17, 2010, U.S. Provisional Application No. 61/424,182 filed on Dec. 17, 2010 and European Application No. 11151730.6 filed on Jan. 21, 2011, the entire contents of each of which are incorporated herein by reference.

The present invention relates to a process for treating subterranean formations wherein a fluid containing an ammonium salt of glutamic acid N,N-diacetic acid (GLDA) and/or methylglycine N,N-diacetic acid (MGDA) is introduced into the formation, to a number of ammonium salts of GLDA and MGDA, and to fluids containing an ammonium salt of GLDA and/or MGDA.

Glutamic acid N,N-diacetic acid and methylglycine N,N-diacetic acid in the acidic or salt form are chelating agents which have been known for several decades and are characterized by a favourable biodegradability. They are disclosed to be of use for a number of applications, for instance in cleaning compositions.

A few documents disclose the use of GLDA and/or MGDA in oil or gas applications. For example, US 2006/288910 discloses the use of GLDA or a salt thereof in cementing in a wellbore. GLDA is said to be a good choice, as it has good biodegradability and low toxicity. WO 2008/0156464 also mentions GLDA as one of the chelating agents that could be used in a treatment fluid in a subterranean formation. U.S. Pat. No. 5,783,524 discloses the use of glycine diacetic acid and salts thereof, like MGDA, for petroleum and natural gas production.

It is a known phenomenon that the ability of microorganisms to degrade certain compounds improves after the exposure of the microorganisms to such compounds over a prolonged period of time ("environmental learning effect"). However, there is still a need to further improve the biodegradability of chelating agents in uses where the chelating agent could come into direct contact with open water, more specifically, where the chelating agent could end up in seawater.

It has now been found that ammonium salts of GLDA and/or MGDA have an unexpectedly higher seawater biodegradability than other salts of GLDA and/or MGDA.

Accordingly, the present invention provides a process for treating a subterranean formation wherein a fluid containing an ammonium salt of glutamic acid N,N-diacetic acid (GLDA) and/or methylglycine N,N-diacetic acid (MGDA) is introduced into the formation.

The term treating in this application is intended to cover any treatment of the formation with the fluid. It specifically covers treating the formation with the fluid to achieve at least one of (i) an increased permeability, (ii) the removal of small particles, and (iii) the removal of inorganic scale, and so enhance the well performance and enable an increased recovery/production of oil and/or gas from the formation. At the same time it may cover cleaning of the wellbore and descaling of the oil/gas production well and production equipment.

The above process can be broadly applied for any operation, even for one that takes place in open water, as the ammonium GLDA and/or MGDA do not pose any threatening toxicity or environmental risk due their unexpectedly high biodegradability in seawater solutions and favourable eco-tox profile. In addition, ammonium GLDA and/or MGDA appear to be very readily soluble in seawater and because of the presence of ammonium cations they have a proton-donating functionality over a wide pH range, which improves the speed with which scale deposits or coatings can be removed. In addition, the ammonium salts of the invention are often found to have a pH-buffering effect and they give a lower salt burden, which increasingly prevents any undesired precipitation reactions and the formation of saturated solutions. The above solubility, pH buffering, and scale removal characteristics of ammonium GLDA and ammonium MGDA lead to a good and/or improved permeability of oil and/or gas-containing formations when the fluids and/or salts of the present invention are used in a process to treat a subterranean formation in accordance with the invention, which is especially notable at elevated temperatures frequently found in subterranean formations.

The invention also relates to an ammonium salt of the formula $M_x(NH_4)_yH_z$-GLDA or the formula $M_x(NH_4)_yH_z$-MGDA, wherein M is an alkalimetal cation, x is at least 0.1, y is at least 0.1, and $x+y+z=4$ for GLDA and $x+y+z=3$ for MGDA, to fluids containing an ammonium salt of GLDA and/or MGDA and seawater, and to fluids containing an ammonium salt of GLDA and/or MGDA and at least one component from the group of mutual solvents, anti-sludge agents, (water-wetting or emulsifying) surfactants, foaming agents, corrosion inhibitors, corrosion inhibitor intensifiers, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, and consolidating agents (such as resins and/or tackifiers). It goes without saying that the above ammonium salts and fluids covered by the present invention can suitably be used in the process of the invention, while giving the technical effects as explained in this document in this same process.

Ammonium GLDA or MGDA can for example be prepared by the addition of an ammonium salt to a solution of acidic GLDA or MGDA. Acidic GLDA or MGDA can be made from tetra alkalimetal GLDA or tri alkalimetal MGDA by a person skilled in the art using any type of ion exchange technique. The acidic GLDA has the formula $M_xH_z$-GLDA, wherein $0<x<4$ and $x+z=4$ and M is the alkalimetal cation, and the acidic MGDA has the formula $M_xH_z$-MGDA, wherein $0<x<3$ and $x+z=3$ and M is the alkalimetal cation. In a preferred embodiment ammonium hydroxide ($NH_4OH$) is used to prepare ammonium GLDA or MGDA, as then the side product is water and not a salt.

Preferably, the ammonium salt of the formula $M_x(NH_4)_yH_z$-GLDA or the formula $M_x(NH_4)_yH_z$-MGDA, wherein M is an alkalimetal cation, x is at least 0.1, and $x+y+z=4$ and, $x+y+z=3$, respectively, contains at least 1 molar equivalent of ammonium cations, i.e. y is at least 1.

Some ammonium salts of GLDA and MGDA are known. For example, EP-A-1004571 suggests the reaction of GLDA in its acidic form with ammonium hydroxide, or an ammonium carbonate which will provide an ammonium salt of GLDA, and explicitly discloses the ammonium ferric salt of GLDA. JP 2002-356464 discloses in the Examples an ammonium GLDA salt and an ammonium MGDA salt made by reaction of GLDA and MGDA in their acidic form with ammonia at pH 7. EP 783 034 and JP 10087582 disclose that ammonium salts can be made from glutamic acid N,N-diacetic acid, though none is exemplified. In addition, none of the above documents discloses the beneficial use of ammonium salts of GLDA in a process to recover oil from oil-containing formations or in a process to remove scale from oil wells in the proximity of open water, like a sea.

Even though sodium salts of GLDA and MGDA already have a satisfactory biodegradability profile in seawater themselves, it was surprisingly found that ammonium salts of GLDA and MGDA have a clearly higher biodegradability in seawater. When measuring the biodegradability of the triammonium salt of GLDA in seawater using closed bottle test OECD 306 (1992) modified only to permit prolonged measurement, it was established that this salt was 29% biodegraded at day 28. Similar results were found for the diammonium salt of GLDA and the ammonium salts of MGDA. Because of the above environmental learning effect, it is expected that these biodegradation results will even improve in the future.

Because of the unexpectedly high seawater biodegradability, the process is of particular benefit where a subterranean formation is accessed through seawater.

The process to recover oil from an oil-containing formation covers a drilling operation wherein a fluid passes down through the inside of the drill string, exits through the drill bit, and returns to the drilling rig through the annulus between the drill string and the wellbore. The fluid in this drilling process in this process embodiment is used to lubricate the drill bit, to transport drill cuttings to the surface, and to balance the formation pressure exerted on the well. The process also covers the creation of flow paths through the formation and the removal of near wellbore formation damage.

The process to remove scale in oil wells covers the removal of any inorganic deposits, scales, filter cakes, or wellbore coatings in the oil well, which deposits, scales, coatings, filter cakes may be caused by minerals (like salts of calcium, barium, iron) and contaminants originally present in the wellbore or derived from the metal apparatuses applied in the recovery of oil from the formation, such as tubulars and storage tanks, and by the intentional addition of inorganic solids during the drilling process.

One particularly difficult scale to remove in the oil and gas industry is iron sulfide. Iron sulfide can be formed in sour wells, i.e. wells that contain $H_2S$. In one embodiment of the invention the process involves the removal or reduction of iron sulfide-containing scale.

In one embodiment in the process for treating a formation, a fluid is used wherein the amount of ammonium GLDA and/or MGDA is up to 50 wt %, preferably between 5 and 40 wt %, even more preferably 10-20 wt % on total weight of the fluid.

In another embodiment a fluid is provided and used that has a pH of between 2 and 10, preferably between 2.5 and 8.

In a preferred embodiment of the invention the fluid contains ammonium GLDA.

The fluids can be used at basically any temperature that is encountered when treating a subterranean formation. The fluids are preferably used at a temperature of between 35 and 400° F. (about 2 and 204° C.). More preferably, the fluids are used at a temperature where they best achieve the desired effects, which means an elevated temperature of between 77 and 400° F. (about 25 and 204° C.), even more preferably 200 and 400° F. (about 93 and 204° C.), most preferably between 300 and 400° F. (about 149 and 204° C.).

The process of the invention is preferably performed at a pressure between atmospheric pressure and fracture pressure, wherein fracture pressure is defined as the pressure above which injection of fluids will cause the formation to fracture hydraulically.

High temperature applications may benefit from the presence of an oxygen scavenger in an amount of less than about 2 volume percent of the solution.

The subterranean formation can be of any nature and in one embodiment is a sandstone or a carbonate formation. Sandstone formations contain siliceous materials, like quartz as the major constituent and in addition may contain various amounts of clays (aluminosilicates such as kaolinite or illite) or alkaline aluminosilicates such as feldspars, and zeolites, as well as carbonates (calcite, dolomite, ankerite) and iron based minerals (hematite and pyrite). Carbonate formations contain calcium carbonates as the major constituent (calcite and dolomite).

The fluid of the invention may contain one or more of the group of mutual solvents, anti-sludge agents, (water-wetting or emulsifying) surfactants, foaming agents, corrosion inhibitors, corrosion inhibitor intensifiers, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives such as further acids and/or bases, bactericides/biocides, particulates, crosslinkers, salt substitutes (such as tetramethyl ammonium chloride), relative permeability modifiers, sulfide scavengers, fibres, nanoparticles, and, in sandstone formations, consolidating agents (such as resins and/or tackifiers).

The fluids of the invention are preferably aqueous fluids, i.e. they preferably contain water as a solvent for the other ingredients, wherein water can be e.g. fresh water, produced water or seawater, though other solvents may be added as well, as further explained in this document.

The mutual solvent is a chemical additive that is soluble in oil, water, acids (often HCl based), and other well treatment fluids. Mutual solvents are routinely used in a range of applications, controlling the wettability of contact surfaces before, during and/or after a treatment, and preventing or breaking emulsions. Mutual solvents are used, as insoluble formation fines pick up organic film from crude oil. These particles are partially oil-wet and partially water-wet. This causes them to collect material at any oil-water interface, which can stabilize various oil-water emulsions.

Mutual solvents remove organic films leaving them water wet, thus emulsions and particle plugging are eliminated. If a mutual solvent is employed, it is preferably selected from the group which includes, but is not limited to, lower alcohols such as methanol, ethanol, 1-propanol, 2-propanol, and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethyl ether, and the like, substantially water/oil-soluble esters, such as one or more C2-esters through 010-esters, and substantially water/oil-soluble ketones, such as one or more C2-C10 ketones. Substantially soluble means in this document soluble in more than 1 gram per liter, preferably more than 10 grams per liter, even more preferably more than 100 grams per liter, most preferably more than 200 grams per liter. The mutual solvent is preferably present in an amount of 1 to 50 wt % on total fluid.

A preferred water/oil-soluble ketone is methyl ethyl ketone.

A preferred substantially water/oil-soluble alcohol is methanol.

A preferred substantially water/oil-soluble ester is methyl acetate.

A more preferred mutual solvent is ethylene glycol monobutyl ether, generally known as EGMBE.

The amount of glycol solvent in the solution is preferably about 1 wt % to about 10 wt %, more preferably between 3 and 5 wt %. More preferably, the ketone solvent may be present in an amount from 40 wt % to about 50 wt %; the substantially water-soluble alcohol may be present in an amount within the range of about 20 wt % to about 30 wt %; and the substantially water/oil-soluble ester may be present in an amount within the range of about 20 wt % to about 30 wt %, each amount being based upon the total weight of the solvent in the fluid.

The surfactant can be any surfactant known in the art and can be nonionic, cationic, anionic, zwitterionic. When the formation is a carbonate formation, preferably, the surfactant is nonionic or cationic and even more preferably, the surfactant is cationic. When the formation is a sandstone formation, preferably, the surfactant is nonionic or anionic, and even more preferably, the surfactant is anionic.

The nonionic surfactant of the present composition is preferably selected from the group consisting of alkanolamides, alkoxylated alcohols, alkoxylated amines, amine oxides, alkoxylated amides, alkoxylated fatty acids, alkoxylated fatty amines, alkoxylated alkyl amines (e.g., cocoalkyl amine ethoxylate), alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides and the like, and mixtures thereof. Alkoxylated alcohols, preferably ethoxylated alcohols, optionally in combination with (alkyl) polyglycosides, are the most preferred nonionic surfactants.

The anionic (sometimes zwitterionic, as two charges are combined into one compound) surfactants may comprise any number of different compounds, including sulfonates, hydrolyzed keratin, sulfosuccinates, taurates, betaines, modified betaines, alkylamidobetaines (e.g., cocoamidopropyl betaine).

The cationic surfactants may comprise quaternary ammonium compounds (e.g., trimethyl tallow ammonium chloride, trimethyl coco ammonium chloride), derivatives thereof, and combinations thereof.

Examples of surfactants that are also foaming agents that may be utilized to foam and stabilize the treatment fluids of this invention include, but are not limited to, betaines, amine oxides, methyl ester sulfonates, alkylamidobetaines such as cocoamidopropyl betaine, alpha-olefin sulfonate, trimethyl tallow ammonium chloride, C8 to C22 alkyl ethoxylate sulfate, and trimethyl coco ammonium chloride.

Suitable surfactants may be used in a liquid or powder form. Where used, the surfactants may be present in the fluid in an amount sufficient to prevent incompatibility with formation fluids, other treatment fluids, or wellbore fluids at reservoir temperature.

In an embodiment where liquid surfactants are used, the surfactants are generally present in an amount in the range of from about 0.01% to about 5.0% by volume of the fluid.

In one embodiment, the liquid surfactants are present in an amount in the range of from about 0.1% to about 2.0% by volume of the fluid, preferably from 0.1 to 1.0% by volume of the fluid. In embodiments where powdered surfactants are used, the surfactants may be present in an amount in the range of from about 0.001% to about 0.5% by weight of the fluid.

The antisludge agent can be chosen from the group of mineral and/or organic acids used for stimulation when the formation is a carbonate, limestone, dolomite, and sandstone hydrocarbon-bearing formation. The function of the acid is to dissolve acid-soluble materials so as to clean or enlarge the flow channels of the formation leading to the wellbore, allowing more oil and/or gas to flow to the wellbore.

Problems are caused by the interaction of the (usually concentrated, 20-28%) stimulation acid and certain crude oils (e.g. aphaltic oils) in the formation to form sludge. Interaction studies between sludging crude oils and the introduced acid show that permanent rigid solids are formed at the acid-oil interface when the aqueous phase is below a pH of about 4. No films are observed for non-sludging crudes with acid.

These sludges are usually reaction products formed between the acid and the high molecular weight hydrocarbons such as asphaltenes, resins, etc.

Methods for preventing or controlling sludge formation with its attendant flow problems during the acidization of crude-containing formations include adding "anti-sludge" agents to prevent or reduce the rate of formation of crude oil sludge, which anti-sludge agents stabilize the acid-oil emulsion and include alkyl phenols, fatty acids, and anionic surfactants. Frequently used as the surfactant is a blend of a sulfonic acid derivative and a dispersing surfactant in a solvent. Such a blend generally has dodecyl benzene sulfonic acid (DDBSA) or a salt thereof as the major dispersant, i.e. anti-sludge, component.

The carrier fluids are aqueous solutions which in certain embodiments contain a Bronsted acid to keep the pH in the desired range and/or contain an inorganic salt, preferably NaCl or KCl.

Corrosion inhibitors may be selected from the group of amine and quaternary ammonium compounds and sulfur compounds. Examples are diethyl thiourea (DETU), which is suitable up to 185° F. (about 85° C.), alkyl pyridinium or quinolinium salt, such as dodecyl pyridinium bromide (DDPB), and sulfur compounds, such as thiourea or ammonium thiocyanate, which are suitable for the range 203-302° F. (about 95-150° C.), benzotriazole (BZT), benzimidazole (BZI), dibutyl thiourea, a proprietary inhibitor called TIA, and alkyl pyridines.

In general, the most successful inhibitor formulations for organic acids and chelating agents contain amines, reduced sulfur compounds or combinations of a nitrogen compound (amines, quats or polyfunctional compounds) and a sulfur compound. The amount of corrosion inhibitor is preferably between 0.1 and 2.0 volume %, more preferably between 0.1 and 1.0 volume % on total fluid volume.

One or more corrosion inhibitor intensifiers may be added, such as for example formic acid, potassium iodide, antimony chloride, or copper iodide.

One or more salts may be used as rheology modifiers to modify the rheological properties (e.g., viscosity and elastic properties) of the treatment fluids. These salts may be organic or inorganic.

Examples of suitable organic salts include, but are not limited to, aromatic sulfonates and carboxylates (such as p-toluene sulfonate and naphthalene sulfonate), hydroxynaphthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethyl ammonium hydrochloride and tetramethyl ammonium chloride.

Examples of suitable inorganic salts include water-soluble potassium, sodium, and ammonium salts (such as potassium chloride and ammonium chloride), calcium chloride, calcium bromide, magnesium chloride, sodium formate, potassium formate, cesium formate, and zinc halide salts. A mixture of salts may also be used, but it should be noted that preferably chloride salts are mixed with chloride salts, bromide salts with bromide salts, and formate salts with formate salts.

Wetting agents that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these and similar such compounds that should be well known to one of skill in the art.

The foaming gas may be air, nitrogen or carbon dioxide. Nitrogen is preferred.

Gelling agents in a preferred embodiment are polymeric gelling agents.

Examples of commonly used polymeric gelling agents include, but are not limited to, biopolymers, polysaccharides such as guar gums and derivatives thereof, cellulose derivatives, synthetic polymers like polyacrylamides and viscoelastic surfactants, and the like. These gelling agents, when hydrated and at a sufficient concentration, are capable of forming a viscous solution.

When used to make an aqueous-based treatment fluid, a gelling agent is combined with an aqueous fluid and the soluble portions of the gelling agent are dissolved in the aqueous fluid, thereby increasing the viscosity of the fluid.

Viscosifiers may include natural polymers and derivatives such as xantham gum and hydroxyethyl cellulose (HEC) or synthetic polymers and oligomers such as poly(ethylene glycol) [PEG], poly(diallyl amine), poly(acrylamide), poly(aminomethyl propyl sulfonate) [AMPS polymer], poly(acrylonitrile), poly(vinyl acetate), poly(vinyl alcohol), poly(vinyl amine), poly(vinyl sulfonate), poly(styryl sulfonate), poly(acrylate), poly(methyl acrylate), poly(methacrylate), poly(methyl methacrylate), poly(vinyl pyrrolidone), poly(vinyl lactam) and co-, ter-, and quater-polymers of the following co-monomers: ethylene, butadiene, isoprene, styrene, divinyl benzene, divinyl amine, 1,4-pentadiene-3-one (divinyl ketone), 1,6-heptadiene-4-one (diallyl ketone), diallyl amine, ethylene glycol, acrylamide, AMPS, acrylonitrile, vinyl acetate, vinyl alcohol, vinyl amine, vinyl sulfonate, styryl sulfonate, acrylate, methyl acrylate, methacrylate, methyl methacrylate, vinyl pyrrolidone, and vinyl lactam. Yet other viscosifiers include clay-based viscosifiers, especially laponite and other small fibrous clays such as the polygorskites (attapulgite and sepiolite). When using polymer-containing viscosifiers, the viscosifiers may be used in an amount of up to 5% by weight of the fluid.

Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, sodium sulfate, potassium nitrate, and the like. A mixture of salts may also be used in the brines, but it should be noted that preferably chloride salts are mixed with chloride salts, bromide salts with bromide salts, and formate salts with formate salts.

The brine chosen should be compatible with the formation and should have a sufficient density to provide the appropriate degree of well control. Additional salts may be added to a water source, e.g., to provide a brine, and a resulting treatment fluid, in order to have a desired density.

The amount of salt to be added should be the amount necessary for formation compatibility, such as the amount necessary for the stability of clay minerals, taking into consideration the crystallization temperature of the brine, e.g., the temperature at which the salt precipitates from the brine as the temperature drops.

Preferred suitable brines may include seawater and/or formation brines.

Salts may optionally be included in the fluids of the present invention for many purposes, including for reasons related to compatibility of the fluid with the formation and the formation fluids.

To determine whether a salt may be beneficially used for compatibility purposes, a compatibility test may be performed to identify potential compatibility problems. From such tests, one of ordinary skill in the art will, with the benefit of this disclosure, be able to determine whether a salt should be included in a treatment fluid of the present invention.

Suitable salts include, but are not limited to, calcium chloride, sodium chloride, magnesium chloride, potassium chloride, sodium bromide, potassium bromide, ammonium chloride, sodium formate, potassium formate, cesium formate, and the like. A mixture of salts may also be used, but it should be noted that preferably chloride salts are mixed with chloride salts, bromide salts with bromide salts, and formate salts with formate salts.

The amount of salt to be added should be the amount necessary for the required density for formation compatibility, such as the amount necessary for the stability of clay minerals, taking into consideration the crystallization temperature of the brine, e.g., the temperature at which the salt precipitates from the brine as the temperature drops.

Salt may also be included to increase the viscosity of the fluid and stabilize it, particularly at temperatures above 180° F. (about 82° C.).

Examples of suitable pH control additives which may optionally be included in the treatment fluids of the present invention are acid compositions and/or bases.

A pH control additive may be necessary to maintain the pH of the treatment fluid at a desired level, e.g., to improve the effectiveness of certain breakers and to reduce corrosion on any metal present in the wellbore or formation, etc.

One of ordinary skill in the art will, with the benefit of this disclosure, be able to recognize a suitable pH for a particular application.

In one embodiment, the pH control additive may be an acid composition. Examples of suitable acid compositions may comprise an acid, an acid-generating compound, and combinations thereof.

Any known acid may be suitable for use with the treatment fluids of the present invention.

Examples of acids that may be suitable for use in the present invention include, but are not limited to, organic acids (e.g., formic acids, acetic acids, carbonic acids, citric acids, glycolic acids, lactic acids, ethylene diamine tetraacetic acid ("EDTA"), hydroxyethyl ethylene diamine triacetic acid ("HEDTA"), and the like), inorganic acids (e.g., hydrochloric acid, and, if the formation is a sandstone formation, stronger acids like hydrofluoric acid, phosphonic acid, p-toluene sulfonic acid), and combinations thereof. Preferred acids are HCl and organic acids.

Examples of acid-generating compounds that may be suitable for use in the present invention include, but are not limited to, esters, aliphatic polyesters, ortho esters, which may also be known as ortho ethers, poly(ortho esters), which may also be known as poly(ortho ethers), poly(lactides), poly(glycolides), poly(epsilon-caprolactones), poly(hydroxybutyrates), poly(anhydrides), or copolymers thereof.

Derivatives and combinations also may be suitable.

The term "copolymer" as used herein is not limited to the combination of two polymers, but includes any combination of polymers, e.g., terpolymers and the like.

Other suitable acid-generating compounds include: esters including, but not limited to, ethylene glycol monoformate, ethylene glycol diformate, diethylene glycol diformate, glyceryl monoformate, glyceryl diformate, glyceryl triformate, methylene glycol diformate, and formate esters of pentaerythritol.

The pH control additive also may comprise a base to elevate the pH of the fluid.

Generally, a base may be used to elevate the pH of the mixture to greater than or equal to about 7.

Having the pH level at or above 7 may have a positive effect on a chosen breaker being used and may also inhibit the corrosion of any metals present in the well bore or formation, such as tubing, screens, etc.

In addition, having a pH greater than 7 may also impart greater stability to the viscosity of the treatment fluid, thereby enhancing the length of time that viscosity can be maintained.

This could be beneficial in certain uses, such as in longer-term well control and in diverting.

Any known base that is compatible with the gelling agents of the present invention can be used in the fluids of the present invention.

Examples of suitable bases include, but are not limited to, sodium hydroxide, potassium carbonate, potassium hydroxide, sodium carbonate, and sodium bicarbonate.

One of ordinary skill in the art will, with the benefit of this disclosure, recognize the suitable bases that may be used to achieve a desired pH elevation.

In some embodiments, the treatment fluid may optionally comprise a further chelating agent.

When added to the treatment fluids of the present invention, the chelating agent may chelate any dissolved iron (or other divalent or trivalent cations) that may be present in the aqueous fluid and prevent any undesired reactions being caused. Such chelating agents may e.g. prevent such ions from crosslinking the gelling agent molecules.

Such crosslinking may be problematic because, inter alia, it may cause filtration problems, injection problems, and/or again cause permeability problems.

Any suitable chelating agent may be used with the present invention.

Examples of suitable chelating agents include, but are not limited to, citric acid, nitrilotriacetic acid ("NTA"), any form of ethylene diamine tetraacetic acid ("EDTA"), hydroxyethyl ethylene diamine triacetic acid ("HEDTA"), diethylene triamine pentaacetic acid ("DTPA"), propylene diamine tetraacetic acid ("PDTA"), ethylene diamine-N,N"-di(hydroxyphenylacetic) acid ("EDDHA"), ethylene diamine-N, N"-di-(hydroxy-methylphenyl) acetic acid ("EDDHMA"), ethanol diglycine ("EDG"), trans-1,2-cyclohexylene dinitrilotetraacetic acid ("CDTA"), glucoheptonic acid, gluconic acid, sodium citrate, phosphonic acid, salts thereof, and the like.

In some embodiments, the chelating agent may be a sodium or potassium salt.

Generally, the chelating agent may be present in an amount sufficient to prevent undesired side effects of divalent or trivalent cations that may be present, and thus also functions as a scale inhibitor.

One of ordinary skill in the art will, with the benefit of this disclosure, be able to determine the proper concentration of a chelating agent for a particular application.

In some embodiments, the fluids of the present invention may contain bactericides or biocides, inter alia, to protect the subterranean formation as well as the fluid from attack by bacteria. Such attacks can be problematic because they may lower the viscosity of the fluid, resulting in poorer performance, such as poorer sand suspension properties, for example.

Any bactericides known in the art are suitable. Biocides and bactericides that protect against bacteria that may attack GLDA or MGDA or sulfates are preferred.

An artisan of ordinary skill will, with the benefit of this disclosure, be able to identify a suitable bactericide and the proper concentration of such bactericide for a given application.

Examples of suitable bactericides and/or biocides include, but are not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, a 2,2-dibromo-3-nitrilopropionamide, and a 2-bromo-2-nitro-1,3-propane diol. In one embodiment, the bactericides are present in the fluid in an amount in the range of from about 0.001% to about 1.0% by weight of the fluid.

Fluids of the present invention also may comprise breakers capable of reducing the viscosity of the fluid at a desired time.

Examples of such suitable breakers for fluids of the present invention include, but are not limited to, oxidizing agents such as sodium chlorites, sodium bromate, hypochlorites, perborate, persulfates, and peroxides, including organic peroxides. Other suitable breakers include, but are not limited to, suitable acids and peroxide breakers, triethanol amine, as well as enzymes that may be effective in breaking. The breakers can be used as is or encapsulated.

Examples of suitable acids may include, but are not limited to, hydrochloric acid, hydrofluoric acid, formic acid, acetic acid, citric acid, lactic acid, glycolic acid, etc.

A breaker may be included in a treatment fluid of the present invention in an amount and form sufficient to achieve the desired viscosity reduction at a desired time.

The breaker may be formulated to provide a delayed break, if desired.

The fluids of the present invention also may comprise suitable fluid loss additives. Such fluid loss additives may be particularly useful when a fluid of the present invention is used in a fracturing application or in a fluid used to seal a formation against invasion of fluid from the wellbore.

Any fluid loss agent that is compatible with the fluids of the present invention is suitable for use in the present invention.

Examples include, but are not limited to, starches, silica flour, gas bubbles (energized fluid or foam), benzoic acid, soaps, resin particulates, relative permeability modifiers, degradable gel particulates, diesel or other hydrocarbons dispersed in fluid, and other immiscible fluids.

Another example of a suitable fluid loss additive is one that comprises a degradable material.

Suitable examples of degradable materials include polysaccharides such as dextran or cellulose; chitins; chitosans; proteins; aliphatic polyesters; poly(lactides); poly(glycolides); poly(glycolide-co-lactides); poly(epsilon-caprolactones); poly(3-hydroxybutyrates); poly(3-hydroxybutyrate-co-hydroxyvalerates); poly(anhydrides); aliphatic poly(carbonates); poly(ortho esters); poly(amino acids); poly(ethylene oxides); poly(phosphazenes); derivatives thereof; or combinations thereof.

In some embodiments, a fluid loss additive may be included in an amount of about 5 to about 2,000 lbs/Mgal (about 600 to about 240,000 g/Mliter) of the fluid.

In some embodiments, the fluid loss additive may be included in an amount from about 10 to about 50 lbs/Mgal (about 1200 to about 6,000 g/Mliter) of the fluid.

In certain embodiments, a stabilizer may optionally be included in the fluids of the present invention.

It may be particularly advantageous to include a stabilizer if a chosen fluid is experiencing viscosity degradation.

One example of a situation where a stabilizer might be beneficial is where the BHT (bottom hole temperature) of the wellbore is sufficient to break the fluid by itself without the use of a breaker.

Suitable stabilizers include, but are not limited to, sodium thiosulfate, methanol, and salts such as formate salts and potassium or sodium chloride.

Such stabilizers may be useful when the fluids of the present invention are utilized in a subterranean formation having a temperature above about 200° F. (about 93° C.). If included, a stabilizer may be added in an amount of from about 1 to about 50 lbs/Mgal (about 120 to about 6,000 g/Mliter) of fluid.

Scale inhibitors may be added to the fluids of the present invention, for example, when such fluids are not particularly compatible with the formation waters in the formation in which they are used.

These scale inhibitors may include water-soluble organic molecules with carboxylic acid, aspartic acid, maleic acids, sulfonic acids, phosphonic acid, and phosphate ester groups including copolymers, ter-polymers, grafted copolymers, and derivatives thereof.

Examples of such compounds include aliphatic phosphonic acids such as diethylene triamine penta (methylene phosphonate) and polymeric species such as polyvinyl sulfonate.

The scale inhibitor may be in the form of the free acid but is preferably in the form of mono- and polyvalent cation salts such as Na, K, Al, Fe, Ca, Mg, $NH_4$. Any scale inhibitor that is compatible with the fluid in which it will be used is suitable for use in the present invention.

Suitable amounts of scale inhibitors that may be included in the fluids of the present invention may range from about 0.05 to 100 gallons per about 1,000 gallons (i.e. 0.05 to 100 liters per 1,000 liters) of the fluid.

Any particulates such as proppant, gravel when the formation is a sandstone formation, and fibres when the formation is a carbonate formation, that are commonly used in subterranean operations may be used in the present invention (e.g., sand, gravel, bauxite, ceramic materials, glass materials when the formation is a sandstone formation, polymer materials, such as polyglycolic acids and polylactic acids when the formation is a carbonate formation, or wood, plant and vegetable matter, nut hulls, walnut hulls, cotton seed hulls, cement, fly ash, fibrous materials, composite particulates, hollow spheres and/or porous proppant when the formation is a sandstone formation).

It should be understood that the term "particulate" as used in this disclosure includes all known shapes of materials including substantially spherical materials, oblong, fibre-like, ellipsoid, rod-like, polygonal materials (such as cubic materials), mixtures thereof, derivatives thereof, and the like.

In some embodiments, coated particulates may be suitable for use in the treatment fluids of the present invention. It should be noted that many particulates also act as diverting agents. Further diverting agents are viscoelastic surfactants and in-situ gelled fluids.

Oxygen scavengers may be needed to enhance the thermal stability of the GLDA or MGDA. Examples thereof are sulfites and ethorbates.

Friction reducers can be added in an amount of up to 0.2 vol % on total volume of the fluid. Suitable examples are viscoelastic surfactants and enlarged molecular weight polymers.

Crosslinkers can be chosen from the group of multivalent cations that can crosslink polymers such as Al, Fe, B, Ti, Cr, and Zr, or organic crosslinkers such as polyethylene amides, formaldehyde.

Sulfide scavengers can suitably be an aldehyde or ketone.

Viscoelastic surfactants can be chosen from the group of amine oxides or carboxyl butane based surfactants.

The fluids can be used at an increased pressure. Often fluids are pumped into the formation under pressure. Preferably, the pressure used is below fracture pressure, i.e. the pressure at which a specific formation is susceptible to fracture. Fracture pressure can vary a lot depending on the formation treated but is well known by the person skilled in the art.

EXAMPLE 1

Figure 1:
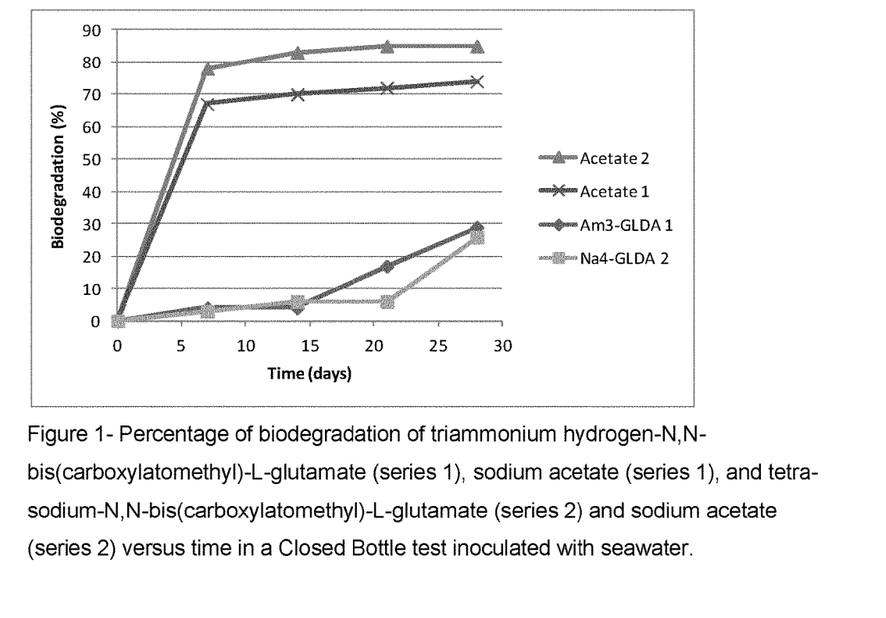
FIG. 1 illustrates the results of the seawater biodegradation test for triammonium GLDA and tetrasodium GLDA, in accordance with Example 1.

In the Examples, GLDA was obtained from Akzo Nobel Functional Chemicals BV. The seawater biodegradability of the sodium and ammonium GLDA was examined according to the guidelines stated in the OECD 306 protocol (1992). Unlike similar screening tests for biodegradability in freshwater systems, this method employs no separate bacterial inoculums and relies upon populations of bacteria which occur naturally in seawater. Therefore, it is more challenging for a substance to meet the criteria for seawater biodegradation than for freshwater degradation. The overall assessment of the biodegradability is based upon a comparison between the experimentally determined oxygen demand and the oxygen demand predicted by the chemical formulation of the substance. During the test the bottles with the test material and seawater are kept in the dark to exclude photodegradation processes that do occur in the natural environment. FIG. 1 shows the results of the seawater biodegradation test for triammonium GLDA and tetrasodium GLDA, indicating that both triammonium GLDA and tetrasodium GLDA have a seawater biodegradation>20%, which makes these compounds suitable for use in the North Atlantic according to the OSPAR regulations. Similar results were obtained for diammonium GLDA. The biodegradation of the triammonium salt is remarkably faster than for sodium GLDA, however, as it already starts after 14 days. From the comparison of the sodium acetate references shown for both the first (triammonium GLDA) and second (tetrasodium GLDA) series of experiments a skilled person in the art will note that the actual difference in biodegradation rate between ammonium and sodium GLDA is significantly greater than is apparent from the graph. This difference in the biodegradation rate of the acetate references is caused by the different amounts of inoculums present in the natural seawater used for testing.

EXAMPLE 2

Figure 2:
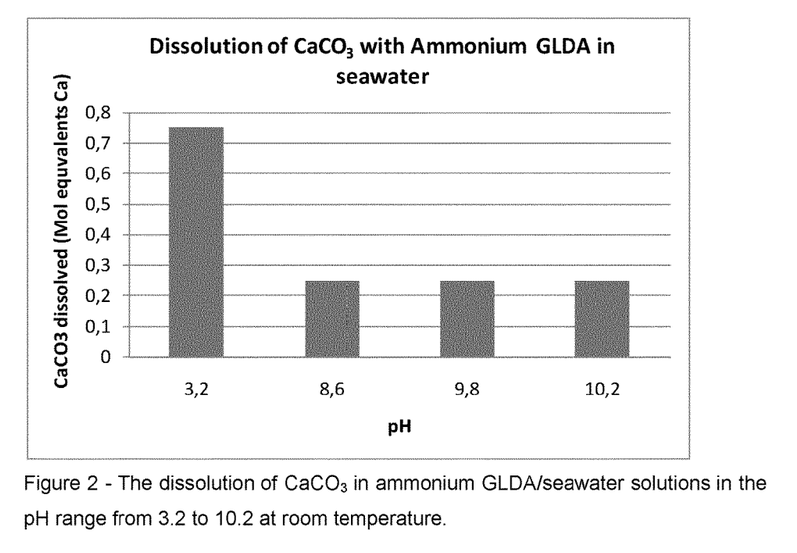
FIG. 2 illustrates the dissolution of $CaCO_3$ in ammonium GLDA/seawater solutions in the pH range from 3.2 to 10.2 at room temperature, in accordance with Example 2.

Ammonium GLDA solutions were prepared from GLDA acid and various amounts of $NH_4OH$, resulting in ammonium GLDA solutions with increasing pH. To these solutions $CaCO_3$ was added to determine the solubility in ammonium GLDA at room temperature. The results are depicted in FIG. 2 and show that ammonium GLDA is able to dissolve significant quantities of $CaCO_3$ especially at pH=3.2 and keep it in solution for at least 5 days. These results are illustrative of the capacity of ammonium GLDA to remove $CaCO_3$-containing scales.

EXAMPLE 3

Figure 3:
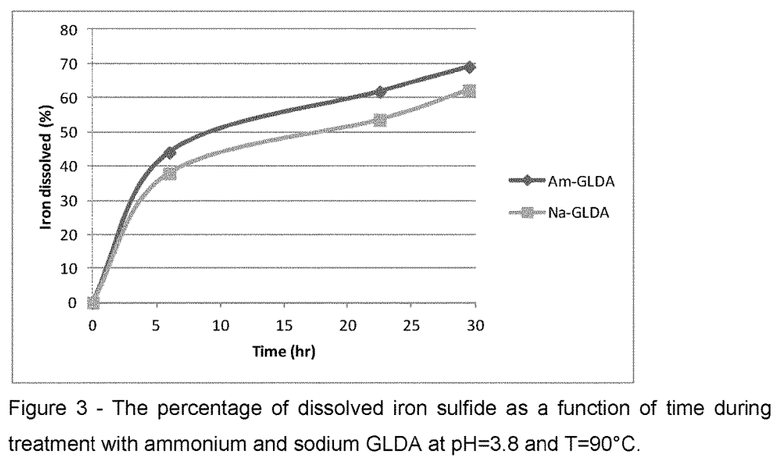
FIG. 3 illustrates the descaling efficiency of ammonium GLDA and sodium GLDA for iron sulfide (FeS) at pH 3.8 and T=90° C., in accordance with Example 3.

The descaling efficiency of ammonium and sodium GLDA for iron sulfide (FeS) at pH 3.8 was compared. A weighted amount (~2.4 mmoles) of FeS and an excess amount of a GLDA solution (65.00 grams; 0.05 moles GLDA) were placed in a 100 ml pressure bottle. The bottle was placed in an oven at 90° C. Samples were taken in time by a syringe and the samples were filtered by a 0.45 micron filter prior to ICP-ES analysis. The descaling efficiency was calculated from the iron concentration in the liquid and the initial amount of FeS. The results are shown in FIG. 3 and indicate that ammonium GLDA dissolves significantly more FeS under these conditions than sodium GLDA.

EXAMPLE 4

Figure 4:
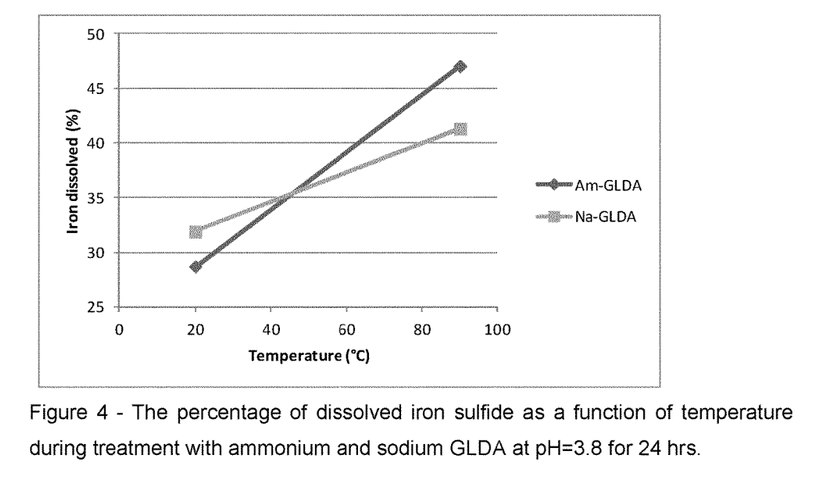
FIG. 4 illustrates the descaling efficiency of ammonium GLDA and sodium GLDA for iron sulfide (FeS) at pH 3.8 as a function of temperature, in accordance with Example 4.

The descaling efficiency as a function of temperature of ammonium and sodium GLDA at pH=3.8 for iron sulfide (FeS) was compared. A weighted amount (~0.5 mmoles) of FeS and an excess amount of a GLDA solution (20 grams; 15 mmoles GLDA) were placed in a 100 ml beaker glass or Parr Bomb with Teflon liner, for the experiments performed at 20° C. or 90° C., respectively. The Parr bomb was placed in an oven at 90° C. The beaker glass was closed with parafilm. After 24 hours at temperature the samples were filtered by a 0.45 micron filter prior to ICP-ES analysis. The descaling efficiency was calculated from the iron concentration in the liquid and the initial amount of FeS. The results are shown in FIG. 4 and indicate that sodium GLDA dissolved more FeS at low temperature, but as soon as the temperature increased, surprisingly the ammonium GLDA dissolved more FeS. It appears that this trend continues when the temperature rises further. Because the use of ammonium GLDA for the removal of FeS is shown to become increasingly advantageous at increased temperature, this makes the application of ammonium GLDA in commercial applications more beneficial, since the oil and gas industry is relying more and more on deeper and hotter wells.

EXAMPLE 5

The descaling efficiency of ammonium GLDA at pH=4 and pH=8 and sodium GLDA at pH=4 for gypsum scale ($CaSO_4.2H_2O$) was determined. An excess weighted amount of gypsum (~39 mmoles) and the appropriate GLDA solution (~25 grams; ~20 mmoles GLDA) were placed in a 50 ml beaker under stirring conditions (500 rpm) at 20° C. After 1.5 hours the samples were filtered by a 0.45 micron filter prior to ICP-ES analysis. The descaling efficiency was calculated from the calcium concentration in moles in the final liquid compared to the moles of GLDA in the liquid and represents the percentage of GLDA that has taken up a calcium ($Ca^{2+}$).

Figure 5:
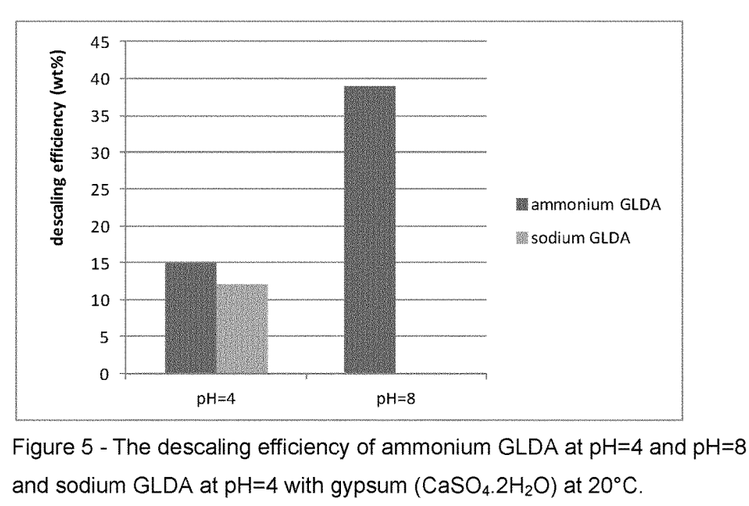
FIG. 5 illustrates the descaling efficiency of ammonium GLDA at pH=4 and pH=8 and sodium GLDA at pH=4 for gypsum scale ($CaSO_4.2H_2O$), in accordance with Example 5.

The results are depicted in FIG. 5 and show that at pH=4 ammonium GLDA can dissolve more gypsum than sodium GLDA. At pH=8 ammonium GLDA is even significantly more effective than at pH=4.

EXAMPLE 6

Figure 6:
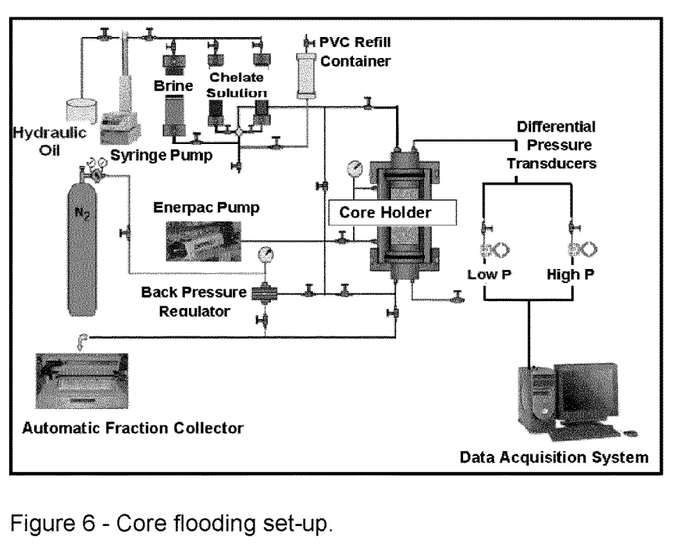
FIG. 6 schematically illustrates the core flooding testing apparatus used in Example 6.

A core flooding experiment was performed to determine the ability of ammonium GLDA mixed with seawater to increase the permeability of Berea sandstone. FIG. 6 shows a schematic diagram for the core flooding apparatus. For the core flooding test a piece of core with a diameter of 1.5 inches and a length of 6 inches was used. The core was placed in the coreholder and shrinkable seals were used to prevent any leakage between the holder and the core.

An Enerpac hand hydraulic pump was used to pump the brine or test fluid through the core and to apply the required overburden pressure. The temperature of the preheated test fluids was controlled by compact bench top CSC32 series, with a 0.1° resolution and an accuracy of ±0.25% full scale ±1° C. It uses a type K thermocouple and two Outputs (5 A 120 Vac SSR). A back pressure of 1,000 psi was applied to keep $CO_2$ in solution.

The back pressure was controlled by a Mity-Mite back pressure regulator model S91-W and kept constant at 300-400 psi less than the overburden pressure. The pressure drop across the core was measured with a set of FOXBORO differential pressure transducers, models IDP10-A26E21F-M1, and monitored by lab view software. Two gauges were installed with ranges of 0-300 psi and 0-1500 psi, respectively.

Before running a core flooding test with sandstone or carbonate, the core was first dried in an oven at 300° F. or 250° F. and weighted. Subsequently, the sandstone core was saturated with 5 wt % NaCl brine at a 2,000 psi overburden pressure and 1,000 psi back pressure, whereas the carbonate core was saturated with water at a 1,500 psi overburden pressure and a 500 psi back pressure. The pore volume was calculated from the difference in weight of the dried and saturated core divided by the brine density.

The core permeability before and after the treatment was calculated from the pressure drop using Darcy's equation for laminar, linear, and steady-state flow of Newtonian fluids in porous media:

$$K=(122.81 q \mu L)/(\Delta p D^2)$$

where K is the core permeability, md, q is the flow rate, cm$^3$/min$_1$. μ is the fluid viscosity, cP, L is the core length, in., Δp is the pressure drop across the core, psi, and D is the core diameter, in.

Prior to the core flooding tests the cores were pre-heated to the required test temperature for at least 3 hours.

The results indicate that ammonium GLDA at a higher temperature of about 300° F. is capable of significantly improving the permeability of the sandstone core. This effect is likely due to the fact that the dissociation of the $NH_4^+$ molecule into $NH_3$ and $H^+$ increases with temperature. As a result more protons are available for the reaction with the acid-soluble components in the sandstone.

Example 7

For the preparation of $NaNH_4H_2$-GLDA, 100 ml NaH3-GLDA (33% as GLDA-H$_4$) and an equimolar amount of $NH_4OH$ (30% as $NH_3$), i.e. 7.6 ml, are mixed together in a 250 ml Erlenmeyer for 5 minutes using a magnetic stirrer. NMR analysis confirms the formation of $NaNH_4H_2$-GLDA.

The invention claimed is:

1. Process for treating a subterranean formation wherein a fluid comprising an ammonium salt of glutamic acid N,N-diacetic acid (GLDA) and/or methylglycine N,N-diacetic acid (MGDA) is introduced into the formation.

2. Process of claim 1, wherein the fluid contains 5 to 50 wt% of an ammonium salt of GLDA and/or MGDA on the basis of the total weight of the fluid.

3. Process of claim 1, wherein the fluid comprises an ammonium GLDA.

4. Process of claim 1, wherein the subterranean formation is a carbonate or sandstone-containing formation.

5. Process of claim 1, wherein the subterranean formation is accessed through seawater.

6. Process of claim 1, wherein the temperature is between 77 and 400° F. (about 25 and 204° C.).

7. The process of claim 1 wherein the fluid further comprises at least one component selected from the group consisting of seawater, mutual solvents, anti-sludge agents, (water-wetting or emulsifying) surfactants, foaming agents, corrosion inhibitors, corrosion inhibitor intensifiers, viscosifiers, wetting agents, diverting agents, oxygen scavengers, carrier fluids, fluid loss additives, friction reducers, stabilizers, rheology modifiers, gelling agents, scale inhibitors, breakers, salts, brines, pH control additives, bactericides/biocides, particulates, crosslinkers, salt substitutes (such as tetramethyl ammonium chloride), relative permeability modifiers, sulfide scavengers, fibres, nanoparticles, and consolidating agents, wherein the fluid is suitable to treat a subterranean formation.

8. Process for treating a subterranean formation wherein a fluid comprising an ammonium salt of glutamic acid N,N-diacetic acid (GLDA) and/or methylglycine N,N-diacetic acid (MGDA) is introduced into the formation, the fluid having a pH≥3.2 and ≤10.2.

* * * * *